United States Patent
Chiasson et al.

(10) Patent No.: US 8,151,011 B2
(45) Date of Patent: Apr. 3, 2012

(54) INPUT-OUTPUT FABRIC CONFLICT DETECTION AND RESOLUTION IN A BLADE COMPUTE MODULE SYSTEM

(75) Inventors: Shane Chiasson, Pflugerville, TX (US); Sompong Paul Olarig, Pleasanton, CA (US); Lee Zaretsky, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 743 days.

(21) Appl. No.: 11/400,931

(22) Filed: Apr. 10, 2006

(65) Prior Publication Data
US 2007/0237071 A1    Oct. 11, 2007

(51) Int. Cl.
*G06F 3/00* (2006.01)
(52) U.S. Cl. .......................................................... 710/15
(58) Field of Classification Search ....................... 710/15
See application file for complete search history.

(56) References Cited

U.S. PATENT DOCUMENTS

| | | | |
|---|---|---|---|
| 6,976,112 B2 * | 12/2005 | Franke et al. | 710/302 |
| 6,983,293 B2 | 1/2006 | Wang | 707/201 |
| 7,013,352 B2 * | 3/2006 | Garnett | 710/1 |
| 7,032,037 B2 * | 4/2006 | Garnett et al. | 710/2 |

* cited by examiner

*Primary Examiner* — Henry Tsai
*Assistant Examiner* — Eric Oberly
(74) *Attorney, Agent, or Firm* — Baker Botts L.L.P.

(57) ABSTRACT

Determining whether there exists an input-output (I/O) fabric conflict (mismatch) between a blade I/O fabric daughter card of a blade compute module and an I/O interface module of a blade compute module system, and if a conflicts does exit then taking action to correct this I/O fabric mismatch. An I/O fabric router may be coupled between the blade I/O fabric daughter cards and the system I/O interface modules. If a matching I/O interface fabric exists then the I/O fabric router will couple the blade I/O fabric daughter card to the matching I/O interface fabric. If there is no matching I/O interface fabric then the blade I/O fabric daughter card may be decoupled from the blade compute module system so that the associated blade compute module may otherwise function, and an alert may be sent regarding the I/O fabric conflict (absence of an I/O fabric match) for the I/O fabric daughter card of the blade compute module.

23 Claims, 4 Drawing Sheets

INPUT-OUTPUT FABRIC CONFLICT DETECTION AND RESOLUTION IN A BLADE COMPUTE MODULE SYSTEM

TECHNICAL FIELD

The present disclosure relates generally to information handling systems and, more particularly, to input-output fabric conflict detection and resolution in a blade compute module system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

As consumer demand increases for smaller and denser information handling systems, manufacturers strive to integrate more computer components into a smaller space. This integration has led to the development of several applications, including high density compute modules. High density compute modules provide the computer processing resources of several computers in a small amount of space. A typical arrangement for a high density compute module system includes a shared power supply system, a management module, shared input-output (I/O) interfaces, a connection board (e.g., a back-plane or mid-plane) and the compute modules.

Blade compute modules, or "blades," are miniaturized compute modules that typically are powered from a common power supply system and are cooled by a cooling system within a multi-compute module cabinet. Typically, a blade includes a circuit board with one or more processors, memory, a connection port, and possibly a disk drive for storage. By arranging a plurality of blades like books on a shelf in the multi-compute module cabinet, a high density multi-compute module system achieves significant cost and space savings over a plurality of conventional computers in separate enclosures. These savings result directly from the sharing of common resources, e.g., I/O interfaces, power supplies, cooling systems, enclosures, etc., and the reduction of space required by this type of multi-compute module system while providing a significant increase in available computer processing power.

Blades may be adaptable for a number of different input-output (I/O) interface protocols in a multi-compute module information handling system. Each of these I/O interface protocols may be interchanged to a user specified fabric, e.g., Ethernet network interface controller (NIC), Fibre Channel (FC), Infiniband, etc., by a modular daughter card associated with the respective blade, e.g., the modular daughter card may plug into a connector on the blade. Each daughter card connector is routed to a specific I/O interface module. All of the daughter cards connected to the specific I/O interface module must have the same fabric as that I/O interface module for proper operation thereof. If a fabric mismatch between a daughter card and an I/O interface module occurs the blade is typically disabled. All variations of daughter cards share a common mechanical form factor and also share a common electrical pin-out for interfacing to the compute module system. Because of the similar mechanical form factor and common electrical pin-out of the different modular daughter cards, it is not uncommon for a fabric mismatch to occur when a wrong daughter card is plugged into a connector (e.g., card socket) on the blade. In addition, even if the daughter cards connected to the blade have the correct fabrics, they can still be populated, e.g., plugged into, the wrong daughter card sockets, i.e., the daughter cards have been swapped. Installation of an incorrect daughter card or incorrect swapping of otherwise correct daughter cards will result in the blade being disabled and thereby becoming non-functional.

SUMMARY

What is needed and desired is a way of detecting a fabric mismatch between a modular daughter card of a blade compute module and an I/O interface module of an information handling system, and taking corrective action so that the blade compute module may maintain full functionality in the information handling system.

According to a specific example embodiment of this disclosure, an information handing system having input-output fabric conflict detection and resolution may comprise a chassis management controller; at least one input-output (I/O) interface; an I/O fabric router; and at least one blade compute module having at least one I/O daughter card and a blade management controller; wherein the at least one I/O daughter card is coupled to the I/O fabric router, the I/O fabric router is coupled to the at least one I/O interface fabric, the blade management controller is coupled to the at least one I/O daughter card, the I/O fabric router and the chassis management controller, and the chassis management controller is coupled to the at least one I/O interface; whereby the blade management controller determines the at least one I/O daughter card fabric and reports the at least one I/O daughter card fabric to the chassis management controller, the chassis management controller determines whether the at least one I/O interface fabric and the at least one I/O daughter card fabric match or do not match, if the at least one I/O interface fabric and the at least one I/O daughter card fabric match then the information handling system boots up, if the at least one I/O interface fabric and the at least one I/O daughter card fabric do not match then the chassis management controller instructs the blade management controller to change the I/O fabric routing through the I/O fabric router so that the at least one I/O interface fabric and the at least one I/O daughter card fabric match, or will disable the at least one I/O daughter card if there is no possible I/O fabric match for the at least one I/O daughter card.

According to another specific example embodiment of this disclosure, an information handling system having input-output fabric conflict detection and resolution may comprise a chassis management controller; at least one input-output (I/O) interface; an I/O fabric router; and at least one blade compute module having at least one I/O daughter card and a blade management controller; wherein the at least one I/O daughter card is coupled to the I/O fabric router, the I/O fabric router is coupled to the at least one I/O interface fabric, the blade management controller is coupled to the at least one I/O daughter card, the I/O fabric router and the chassis management controller, and the chassis management controller is coupled to the at least one I/O interface; whereby the chassis management controller determines the at least one I/O interface fabric and reports the fabric to the blade management controller, the blade management controller determines the at least one I/O daughter card fabric and then determines whether the at least one I/O interface fabric and the at least one I/O daughter card fabric match or do not match, if the at least one I/O interface fabric and the at least one I/O daughter card fabric match then the information handling system boots up, if the at least one I/O interface fabric and the at least one I/O daughter card fabric do not match then the blade management controller changes the I/O fabric routing through the I/O fabric router so that the at least one I/O interface fabric and the at least one I/O daughter card fabric match, or will disable the at least one I/O daughter card if there is no possible I/O fabric match for the at least one I/O daughter card.

According to yet another specific example embodiment of this disclosure, a method for detecting input-output fabric conflicts and resolving any detected fabric conflicts in an information handling system may comprise the steps of: determining input-output (I/O) fabric types of a plurality of I/O interfaces in an information handling system; determining I/O fabric types of a plurality of I/O daughter cards associated with a plurality of blade compute modules; coupling each I/O fabric type of the plurality of I/O daughter cards to an associated one of the plurality of I/O interfaces having the same I/O fabric type; and decoupling any one of the I/O daughter cards having an I/O fabric type not found in any one of the plurality of I/O interfaces.

According to still another specific example embodiment of this disclosure, a method for detecting input-output fabric conflicts and resolving any detected fabric conflicts in an information handling system may comprise the steps of: initiating power-up of an information handling system comprising a plurality of blade compute modules and a plurality of input-output (I/O) interfaces; detecting I/O fabric types of a plurality of I/O daughter cards associated with the plurality of blade compute modules; detecting I/O fabric types of the plurality of I/O interfaces; determining whether there are any I/O fabric conflicts with how the I/O fabrics of the plurality of I/O daughter cards are coupled to the I/O fabrics of the plurality of I/O interfaces, wherein if there are no I/O fabric conflicts then sending a power-up confirmation to a blade management controller of each of the plurality of blade compute modules, enabling each of the I/O daughter cards, and continuing booting up the information handling system; if there is an I/O fabric conflict then determining if the I/O fabric conflict can be resolved, if the I/O fabric conflict can be resolved then swapping fabric connections to resolve the I/O fabric conflict, and if the I/O fabric conflict cannot be resolved then sending a power-up denial to the blade management controller of the one of the plurality of blade compute modules having the I/O fabric conflict and disabling the one of the plurality of blade compute modules having the I/O fabric conflict.

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Figure 1:
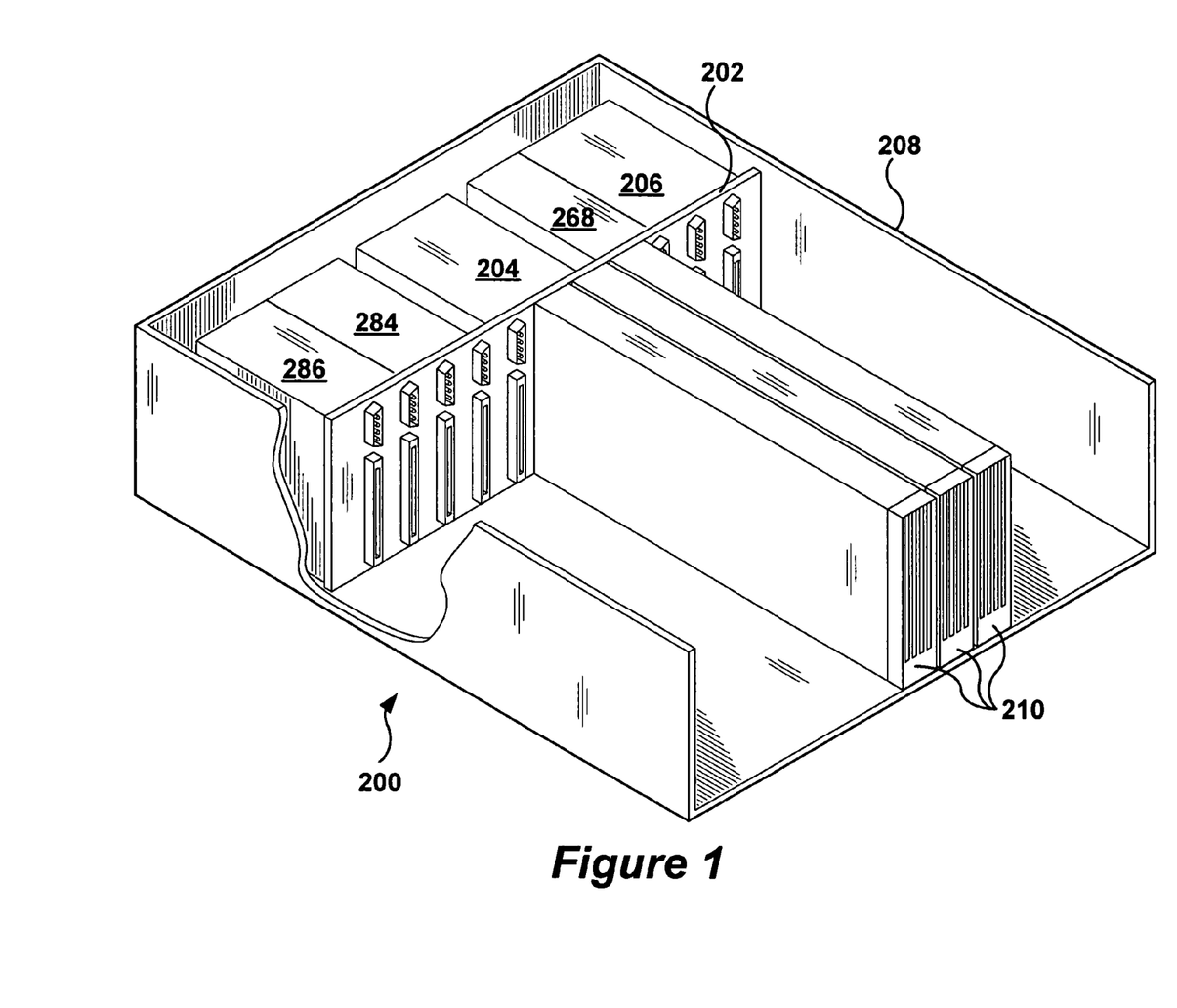
FIG. 1 is a schematic perspective view of a high density information handling blade compute module system, according to a specific example embodiment of the present disclosure.

Referring to FIG. 1, depicted is a schematic perspective view of a high density information handling blade compute module system, according to a specific example embodiment of the present disclosure. The information handling blade compute module system, generally represented by the numeral 200, comprises at least one blade compute module (BCM) 210, a power distribution board (PDB) 202, at least one power supply unit (PSU) 206, at least one input-output (I/O) interfaces 284 and 286, a chassis management controller (CMC) 204, and an I/O fabric router 268. In certain embodiments, one example of an information handling blade compute module system 200 includes a high density blade compute module system 200 that may form a part of a component rack system (not expressly shown). Typically, the high density blade compute module system 200 may include an enclosure or chassis 208 in which the at least one PSU 206, I/O interfaces 284 and 286, CMC 204, PDB 202 and the at least one BCM 210 may be enclosed therein. Each BCM 210 may include a blade management controller (BMC) 212 (see FIG. 2).

Although FIG. 1 depicts a mid-plane PDB 202 as being placed between CMC 204 and the at least one BCM 210, the PDB 202 may be located anywhere in the information handling system 200, even external to the chassis 208. In alternate embodiments, the PDB 202 may be located along the back of the information handling blade compute module system 200 and may be referred to as a power distribution back-plane (not shown).

The high density blade compute module system 200 may be coupled to other computer components such as keyboards, video displays and pointing devices (not expressly shown). Typically, the information handling system 200 may include more than one PSU 206 such that a redundant power source may be provided. The PSU 206 may supply an output, e.g., an electrical voltage(s) for the at least one BCM 210. Generally, the PSU 206 output is coupled through the PDB 202 for distribution to the at least one BCM 210. The at least one I/O interfaces 284 and 286 may be coupled to various I/O fabrics associated with the BCMs 210 represented by various data transfer communications protocols, e.g., Ethernet, Fibre Channel, Infiniband, etc. Thereby allowing the information handling system 200 to communicate through the at least one I/O interfaces 284 and 286 to the desired communications protocol(s). Each of the at least one I/O interfaces 284 and 286 may be coupled to any or all of the BCMs 210 over appropriate communications protocol fabrics selected by I/O fabric daughter cards 264 and/or 268 associated with each of the BCMs 210 (see FIG. 2). An I/O fabric router 268 may be located separately, e.g., on the midplane 202, from the BCMs 210, and/or I/O fabric routers (multiple routers not shown in FIG. 2) may be located on each of the BCMs 210a-210m.

Figure 2:
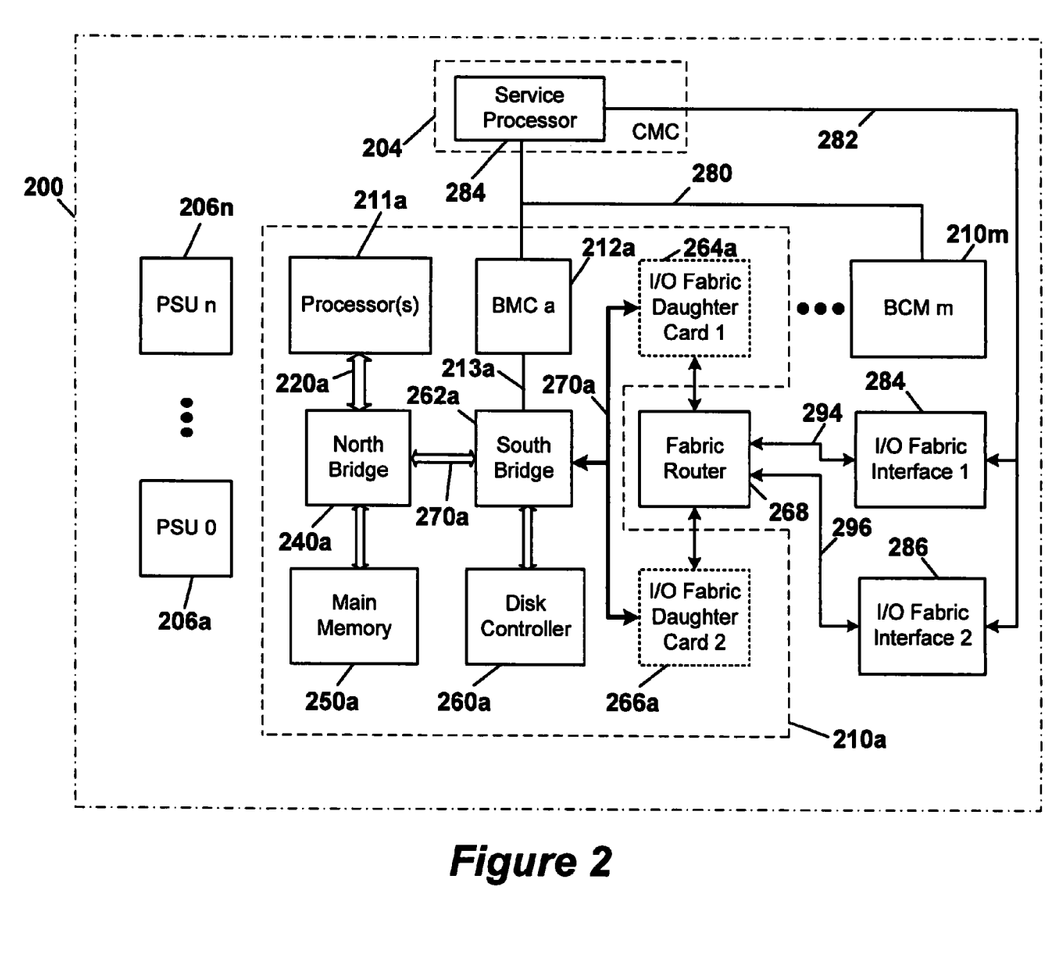
FIG. 2 is a schematic block diagram of an information handling blade compute module system, according to a specific example embodiment of the present disclosure.

Referring to FIG. 2, depicted is a schematic block diagram of an information handling blade compute module system having electronic components mounted on at least one printed circuit board (PCB) (motherboard not shown) and communicating data and control signals therebetween over signal buses, according to a specific example embodiment of the present disclosure. In one specific example embodiment, the information handling blade compute module system is a computer blade compute module system. The information handling compute module system, generally referenced by the numeral 200, may comprise one or more blade compute modules (BCMs) 210a-210m. For each of the blade compute modules (BCMs) 210a-210m (for illustrative purposes only components for BCM 210a are shown) there may be a processor(s) 211a, a north bridge 240a, which may also be referred to as a memory controller hub or a memory controller that is coupled to a main system memory 250a, and the blade management controller (BMC) 212a. The north bridge 240a is coupled to the processor(s) 210a via the host bus 220a. The north bridge 240a is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 240a. The chip set may also be packaged as an application specific integrated circuit (ASIC). The north bridge 240a typically includes functionality to couple the main system memory 250a to other devices within the information handling system 200. Thus, memory controller functions such as main memory control functions typically reside in the north bridge 240a. In addition, the north bridge 240a provides bus control to handle transfers between the host bus 220a and a second bus(es), e.g., PCI bus 270a. A third bus(es) 268a may also comprise other industry standard buses or proprietary buses, e.g., ISA, SCSI, $I^2C$, SPI, USB, LPC buses through a south bridge(s) (bus interface) 262a. The BMC 212a may be coupled to the blade 210a with a low pin count (LPC) bus 213a through the south bridge 262a. Each BMC 212 of the blades 210 may be coupled to a service processor 284 in the CMC 204 over, for example but not limited to, a standard Ethernet link 280. The CMC 204 may control various blade system chassis functions and may be used to communicate (e.g., broadcast firmware updates) to each BMC 212 of the blades 210 in the blade compute module system 200.

The I/O interfaces 284 and 286 may be common to all of the BCMs 210. These I/O interfaces 284 and 286 may be used for communicating with external networks, disk drives, etc., over various communications protocols, e.g., Ethernet, Fibre Channel, Infiniband, etc. Each of these I/O interfaces 284 and 286 may have fabric busses 294 and 296, respectively, that are unique to the I/O interface types. Each of the BCMs 210 may communicate to desired ones of the I/O interfaces 284 and/or 286 with I/O fabric daughter cards 264a and/or 266a. The I/O fabric daughter cards 264a and/or 266a may be coupled to the south bridge 262a data bus 270a and to the respective ones of the fabric busses 294 and 296 through a fabric router 268. It is contemplated and within the scope of this disclosure that one or more I/O fabric daughter cards, e.g., N, where N is a positive integer number, may be contained on a BCM 210 and one or more I/O fabric interfaces, e.g., N, where N is a positive integer number, may be part of the information handling system 200. The I/O fabric router 268 may be located separately, e.g., on the midplane 202, from the BCMs 210, and/or there may be a plurality of I/O fabric routers (multiple routers not shown in FIG. 2) that may be located on respective ones of the BCMs 210a-210m.

Figure 3:
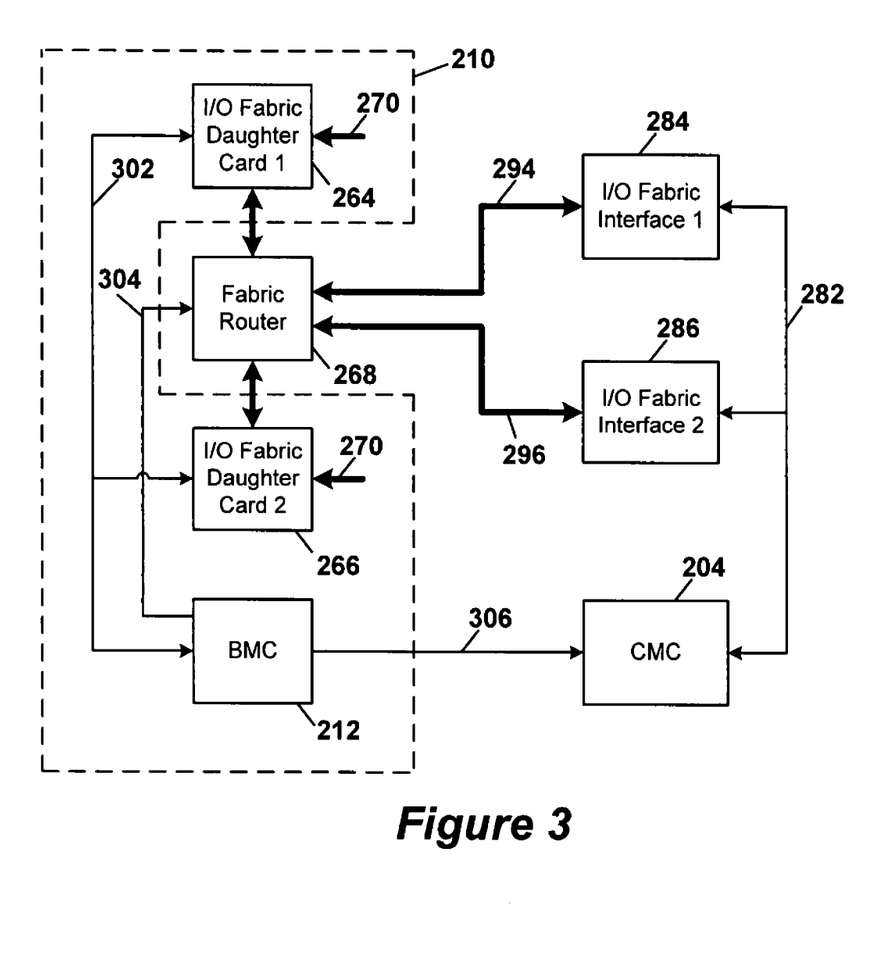
FIG. 3 is a schematic block diagram of a more detailed input-output (I/O) fabric topology of the information handling blade compute module system illustrated in FIG. 2, according to a specific example embodiment of the present disclosure.

Referring now to FIG. 3, depicted is a schematic block diagram of a more detailed input-output (I/O) fabric topology of the information handling blade compute module system illustrated in FIG. 2, according to a specific example embodiment of the present disclosure. The I/O fabric daughter cards 264 and 266 are coupled to bus 270 of the BCM 210 and to the fabric router 268. The fabric router 268 couples each of the I/O fabric daughter cards 264 and 266 to respective ones of the I/O interfaces 284 and 286. The BMC 212 may monitor the I/O fabric daughter cards 264 and 266, over information bus 302 to determine the I/O fabric type of each of the I/O fabric daughter cards 264 and 266. The CMC 204 also may monitor the I/O interfaces 284 and 286, over bus 282, to determine the I/O fabric types thereof.

The CMC 204 and BMC 212 may communicate with each other, over bus 306, so that the BMC 212 may be aware of what I/O interfaces are located on the busses 294 and 296. Since the BMC 212 knows the I/O fabric type of each of the I/O fabric daughter cards 264 and 266, if there is a corresponding I/O interface 284 and/or 286 of the same fabric type then the BMC 212 may control the fabric router 268 so as to couple the I/O fabric daughter cards 264 and 266 to the respective ones of the I/O interface 284 and 286. It is contemplated and within the scope of this disclosure that one or more I/O fabric daughter cards, e.g., N, where N is a positive integer number, may be contained on a BCM 210 and that one or more I/O fabric interfaces, e.g., N, where N is a positive integer number, may be part of the information handling system 200. This configuration may be incorporated for each of the BCMs 210, and the I/O interface 284 and 286 incorporated into the information handling system 200 (see FIG. 1). If there is not a corresponding I/O interface for an I/O fabric daughter card, then the BMC may disable that I/O daughter card and/or not couple the unpaired I/O fabric daughter from any of the fabric busses 294 and 296.

For example, when the information handling system 200 is started up, the CMC 204 may monitor the fabric types of the I/O interfaces 284 and 286 therein (It is contemplated and within the scope of this disclosure that more than two I/O interfaces may be present). The I/O fabric daughter cards of each BCM 210 may be monitored with the respective BMC 212. The monitored information of what I/O interfaces are in the information handling system 200 may be sent to each of the BMCs 212 such that each BMC 212 may control its associated fabric router 268 to couple the I/O fabric daughter cards 264 and 266 to the appropriate fabric busses for operation with the appropriate I/O interfaces 284 and 286. Otherwise if there no match between an I/O fabric daughter card and an I/O interface then the BMC 212 may disable that I/O fabric daughter card and issue an error message to alert an information system administrator and/or technical support.

Alternatively, the BMC 212 may only monitor the type (function) of each of the respective I/O fabric daughter cards 264 and 266 in the associated BCM 210, and then each BMC 212 may report the type(s) of I/O fabric daughter cards 264 and 266 in the respective BCM 210 to the CMC 204. When a fabric conflict is detected, the CMC 204 may be able to determine if the fabric conflict can be resolved by swapping the fabric interconnections (busses) with the fabric router 268. If a resolution is possible then the CMC 204 may instruct the respective BMC 212 to cause the fabric router 268 to swap (interchange) the fabric busses 294 and 296 between the I/O fabric daughter cards 264 and 266 so as to obtain correct fabric matching therebetween. If no resolution is possible, then the daughter card fabric interconnection may be disabled and an appropriate alert message may be sent to a user, administrator, etc.

The aforementioned operation may allow a blade to continue to function if there is an I/O fabric mismatch due to technician or user error. Damage to the information handling system circuits may also be prevented due to I/O fabric mismatched connections. No longer will the information handling system hang-up during a boot because of mismatched I/O fabric daughter cards and I/O interfaces. According to the teachings of this specification, optimized PCI Express bandwidth may be obtained by allocating only those lanes that are being used.

Figure 4:
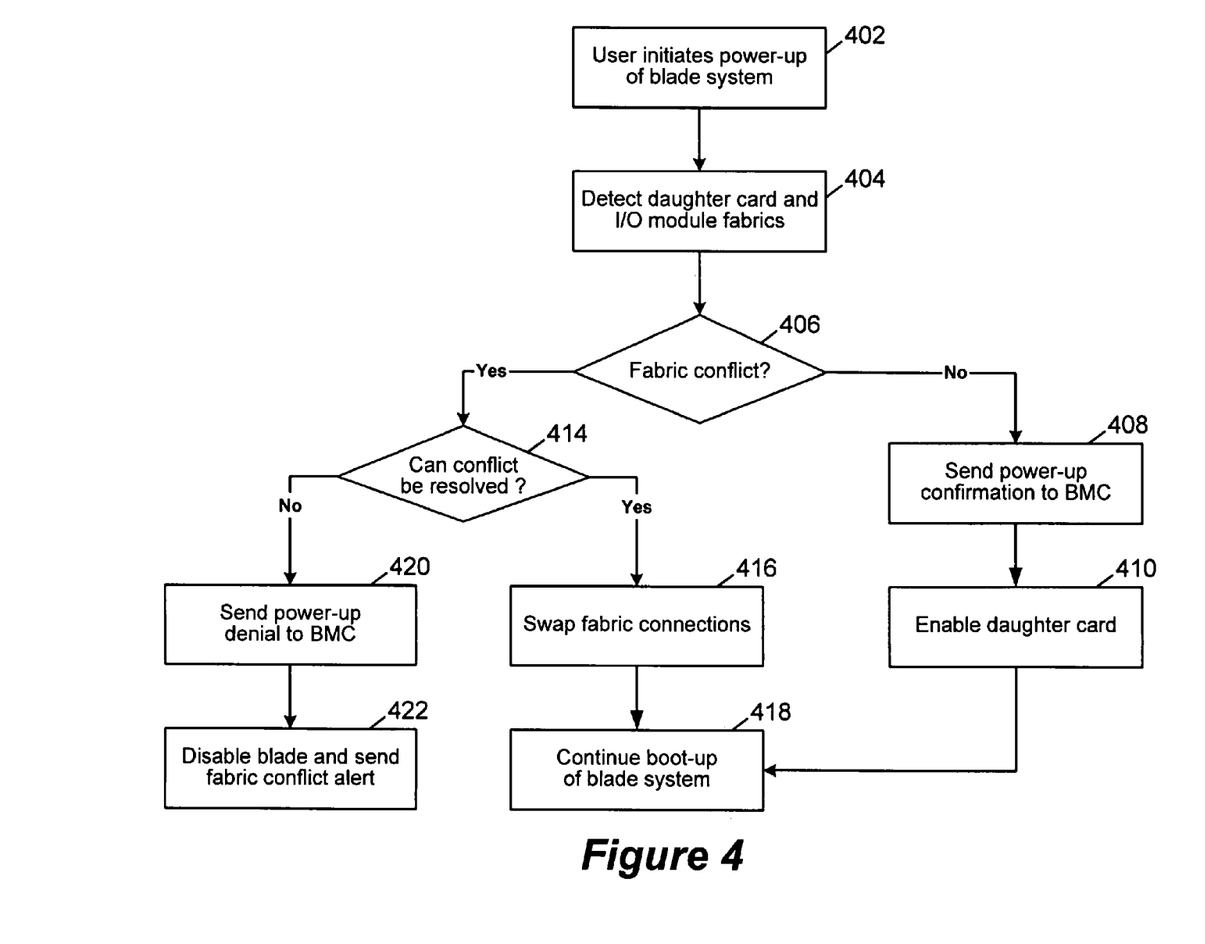
FIG. 4 is a flow diagram of a sequence of steps for checking input-output (I/O) fabric topology in a blade compute module system and for taking corrective action when an I/O fabric topology conflict exists, according to a specific example embodiment of the present disclosure.

Referring now to FIG. 4, depicted is a flow diagram of a sequence of steps for checking input-output (I/O) fabric topology in a blade compute module system and for taking corrective action when an I/O fabric topology conflict exists, according to a specific example embodiment of the present disclosure. In Step 402 of FIG. 4, a user initiates a power-up of a blade compute module system. In step 404 detection of the daughter card and I/O interface module fabrics are determined. In step 406, a determination is made whether a fabric conflict exists. If no fabric conflict exists, then in step 408 a power-up confirmation is sent to the BMC. In step 410 the appropriate daughter cards are enabled and then in step 418 the boot-up of the blade compute module system continues. If there is a fabric conflict, then in step 414 a determination is made whether the conflict may be resolved by swapping daughter card fabric connections to the appropriate I/O interface modules in step 416. Then going to step 418 for continuing boot-up of the blade compute module system. If the conflict cannot be resolved then in step 420 a power-up denial is sent to the respective BMC, and in step 422 that blade I/O fabric may be disabled and an unresolved fabric conflict alert is sent to a user and/or systems administrator.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An information handling system having input-output fabric conflict detection and resolution, said system comprising:

a chassis management controller;
at least one input-output (I/O) interface, wherein each of the at least one I/O interface has one first I/O fabric type;
an I/O fabric router; and
at least one blade compute module having at least one I/O daughter card, and a blade management controller, wherein each of the at least one I/O daughter card has one second I/O fabric type;

wherein:
the at least one I/O daughter card is coupled to the I/O fabric router,
the I/O fabric router is coupled to the at least one I/O interface,
the blade management controller is coupled to the at least one I/O daughter card, the I/O fabric router, and the chassis management controller; and
the chassis management controller is coupled to the at least one I/O interface;

whereby:
the blade management controller is configured to determine the second I/O fabric type of each of the at least one I/O daughter card and report the second I/O fabric type of each of the at least one I/O daughter card to the chassis management controller;
the chassis management controller is configured to determine whether the first I/O fabric type of each of the at least one I/O interface matches the second I/O fabric type of each of the at least one I/O daughter card;
if the second I/O fabric type of at least one of the at least one I/O daughter card matches the first I/O fabric type of at least one of the at least one I/O interface, then the information handling system is configured to boot up and the chassis management controller is configured to instruct the blade management controller to change I/O fabric routing for the matching at least one of the at least one I/O daughter card and at least one of the at least one I/O interface through the I/O fabric router; and
if no first I/O fabric type of at least one of the at least one I/O interface matches the second fabric type of the at least one I/O daughter card, then the chassis management controller is configured to disable the at least one I/O daughter card.

2. The information handling system according to claim 1, wherein the at least one I/O interface is selected from the group consisting of an Ethernet I/O interface, a Fibre Channel I/O interface, and an Infiniband I/O interface.

3. The information handling system according to claim 1, wherein the at least one I/O daughter card plugs into a card connector on the at least one blade compute module.

4. The information handling system according to claim 1, wherein the at least one I/O daughter card is a plurality of I/O daughter cards.

5. The information handling system according to claim 4, wherein the plurality of I/O daughter cards comprises N daughter cards, where N is a positive integer value.

6. The information handling system according to claim 4, wherein the at least one I/O interface is a plurality of I/O interfaces.

7. The information handling system according to claim 6, wherein the plurality of I/O interfaces and the plurality of I/O daughter cards have corresponding I/O fabrics.

8. An information handling system having input-output fabric conflict detection and resolution, said system comprising:
a chassis management controller;
at least one input-output (I/O) interface, wherein each of the at least one I/O interface has one first I/O fabric type;
an I/O fabric router; and
at least one blade compute module having at least one I/O daughter card, and a blade management controller, wherein each of the at least one I/O daughter card has one second I/O fabric type;
wherein:
the at least one I/O daughter card is coupled to the I/O fabric router;
the I/O fabric router is coupled to the at least one I/O interface fabric;
the blade management controller is coupled to the at least one I/O daughter card, the I/O fabric router, and the chassis management controller; and
the chassis management controller is coupled to the at least one I/O interface;
whereby:
the chassis management controller is configured to determine the first I/O fabric type of each of the at least one I/O interface and report the first I/O fabric type of each of the at least one I/O interface to the blade management controller;
the blade management controller is configured to determine the second I/O fabric type of each of the at least one I/O daughter card and determine whether the first I/O fabric type of at least one of the at least one I/O interface matches the second I/O fabric type of the at least one I/O daughter card ;
if the first I/O fabric type of at least one of the at least one I/O interface and the second I/O fabric type of the at least one I/O daughter card matches, then the information handling system is configured to boot up and the blade management controller is configured to change I/O fabric routing for the matching at least one of the at least one I/O interface fabric and the at least one I/O daughter card through the I/O fabric router; and
if the second I/O fabric type of the at least one I/O daughter card does not match the first I/O fabric type of at least one I/O interface, then the blade management controller is configured to disable the at least one I/O daughter card.

9. The information handling system according to claim 8, wherein the at least one I/O interface is selected from the group consisting of an Ethernet I/O interface, a Fibre Channel I/O interface, and an Infiniband I/O interface.

10. The information handling system according to claim 8, wherein the at least one I/O daughter card plugs into a card connector on the at least one blade compute module.

11. The information handling system according to claim 8, wherein the at least one I/O daughter card is a plurality of I/O daughter cards.

12. The information handling system according to claim 11, wherein the plurality of I/O daughter cards comprises N daughter cards, where N is a positive integer value.

13. The information handling system according to claim 11, wherein the at least one I/O interface is a plurality of I/O interfaces.

14. The information handling system according to claim 13, wherein the plurality of I/O interfaces and the plurality of I/O daughter cards have corresponding I/O fabrics.

15. A method for detecting input-output fabric conflicts and resolving any detected fabric conflicts in an information handling system, said method comprising the steps of:
determining input-output (I/O) fabric types of a plurality of I/O interfaces in an information handling system, wherein each of the plurality of I/O interfaces has one I/O fabric type;
determining I/O fabric types of a plurality of I/O daughter cards associated with a plurality of blade compute modules, wherein each of the plurality of I/O daughter cards has one I/O fabric type;
coupling each I/O fabric type of the plurality of I/O daughter cards to an associated one of the plurality of I/O interfaces having the same I/O fabric type, wherein the step of coupling comprises changing I/O fabric routing of the plurality of I/O daughter cards through an I/O fabric router so that at least one of the I/O fabric types of the plurality of I/O interfaces and the plurality of I/O daughter cards match;
decoupling any one of the I/O daughter cards having an I/O fabric type not found in any one of the plurality of I/O interfaces, and
disabling the one of the plurality of blade compute modules having the I/O daughter card with an I/O fabric type not found in any one of the plurality of I/O interfaces.

16. The method according to claim 15, further comprising the steps of:
sending a power-up denial to a one of the plurality of blade compute modules having the I/O daughter card with the I/O fabric type not found in any of the plurality of I/O interfaces, and
sending a fabric conflict alert.

17. The method according to claim 15, further comprising the step of booting up all of the plurality of blade compute modules having no I/O fabric conflicts.

18. A method for detecting input-output fabric conflicts and resolving any detected fabric conflicts in an information handling system, said method comprising the steps of:
initiating power-up of an information handling system comprising a plurality of blade compute modules and a plurality of input-output (I/O) interfaces;
detecting I/O fabric types of a plurality of I/O daughter cards associated with the plurality of blade compute modules, wherein each of the plurality of I/O daughter cards has one I/O fabric type;

detecting I/O fabric types of the plurality of I/O interfaces, wherein each of the plurality of I/O interfaces has one I/O fabric type;

determining whether there are any I/O fabric conflicts with how the I/O fabrics of the plurality of I/O daughter cards are coupled to the I/O fabrics of the plurality of I/O interfaces, wherein if there are no I/O fabric conflicts then sending a power-up confirmation to a blade management controller of each of the plurality of blade compute modules, enabling each of the I/O daughter cards, and continuing booting up the information handling system;

if there is an I/O fabric conflict then determining if the I/O fabric conflict can be resolved, if the I/O fabric conflict can be resolved then swapping fabric connections through an I/O fabric router to resolve the I/O fabric conflict, and if the I/O fabric conflict cannot be resolved then sending a power-up denial to the blade management controller of the one of the plurality of blade compute modules having the I/O fabric conflict and disabling the one of the plurality of blade compute modules having the I/O fabric conflict.

19. The method according to claim 18, further comprising the step of sending an I/O fabric conflict alert when the I/O fabric conflict occurs.

20. The information handling system according to claim 1, wherein the I/O fabric router is part of the at least one blade compute module.

21. The information handling system according to claim 1, wherein the I/O fabric router is separate from the at least one blade compute module.

22. The information handling system according to claim 8, wherein each at least one blade compute module has an I/O fabric router.

23. The information handling system according to claim 8, wherein the at least one blade compute module is separate from the I/O fabric router.

* * * * *